United States Patent [19]

Kampf et al.

[11] Patent Number: 4,852,363
[45] Date of Patent: Aug. 1, 1989

[54] AIR CONDITIONER HUMIDITY CONTROL SYSTEM

[75] Inventors: Hans Kampf, Korb; Karl Lochmahr, Vaihingen/Enz, both of Fed. Rep. of Germany

[73] Assignee: Sueddeutsche Kuehlerfabrik, Julius Fr., Behr GmbH & Co. KG, Stuttgart, Fed. Rep. of Germany

[21] Appl. No.: 272,937

[22] Filed: Nov. 18, 1988

[30] Foreign Application Priority Data

Nov. 20, 1987 [DE] Fed. Rep. of Germany ....... 3739372

[51] Int. Cl.$^4$ ................................................ B01F 3/02
[52] U.S. Cl. ...................................... 62/176.6; 165/21; 236/44 A
[58] Field of Search ...................... 62/176.6; 236/44 R, 236/44 A; 165/21, 20

[56] References Cited

U.S. PATENT DOCUMENTS 4,424,933  1/1984  Sutoh et al. ........................ 165/21 X

FOREIGN PATENT DOCUMENTS

| 43668 | 5/1985 | European Pat. Off. |
|---|---|---|
| 1245774 | 7/1967 | Fed. Rep. of Germany . |
| 3215802 | 11/1983 | Fed. Rep. of Germany . |
| 3504156 | 8/1986 | Fed. Rep. of Germany . |
| 3624171 | 1/1988 | Fed. Rep. of Germany . |
| 56-31815 | 3/1981 | Japan . |
| 0147913 | 9/1982 | Japan .................................. 62/176.6 |
| 0175412 | 10/1982 | Japan .................................. 62/176.6 |
| 61-110613 | 5/1986 | Japan . |
| 61-178218 | 8/1986 | Japan . |

Primary Examiner—William E. Wayner
Attorney, Agent, or Firm—Foley & Lardner, Schwartz, Jeffery, Schwaab, Mack, Blumenthal & Evans

[57] ABSTRACT

In an air conditioner for a motor vehicle, which, for the purpose of controlling the humidity, has in the ir duct suitable devices, controlled by a microcomputer. The microcomputer receives values for outside temperature, inside temperature and inside humidity, measured by sensors. From the values for outside temperature, inside temperature and inside humidity, the microcomputer determines the threshold humidity ($l_{thresh}$) as the ratio of the saturated vapor pressure ($P_S$) inside at the pane and the saturated vapor pressure ($P_i$) of the inside air. If this difference ($\Delta l$) between threshold humidity ($l_{thresh}$) and inside humidity ($l_i$) falls below a stipulated value (x), dehumidification devices are actuated. If the stipulated value is exceeded, humidification devices are actuated.

16 Claims, 3 Drawing Sheets

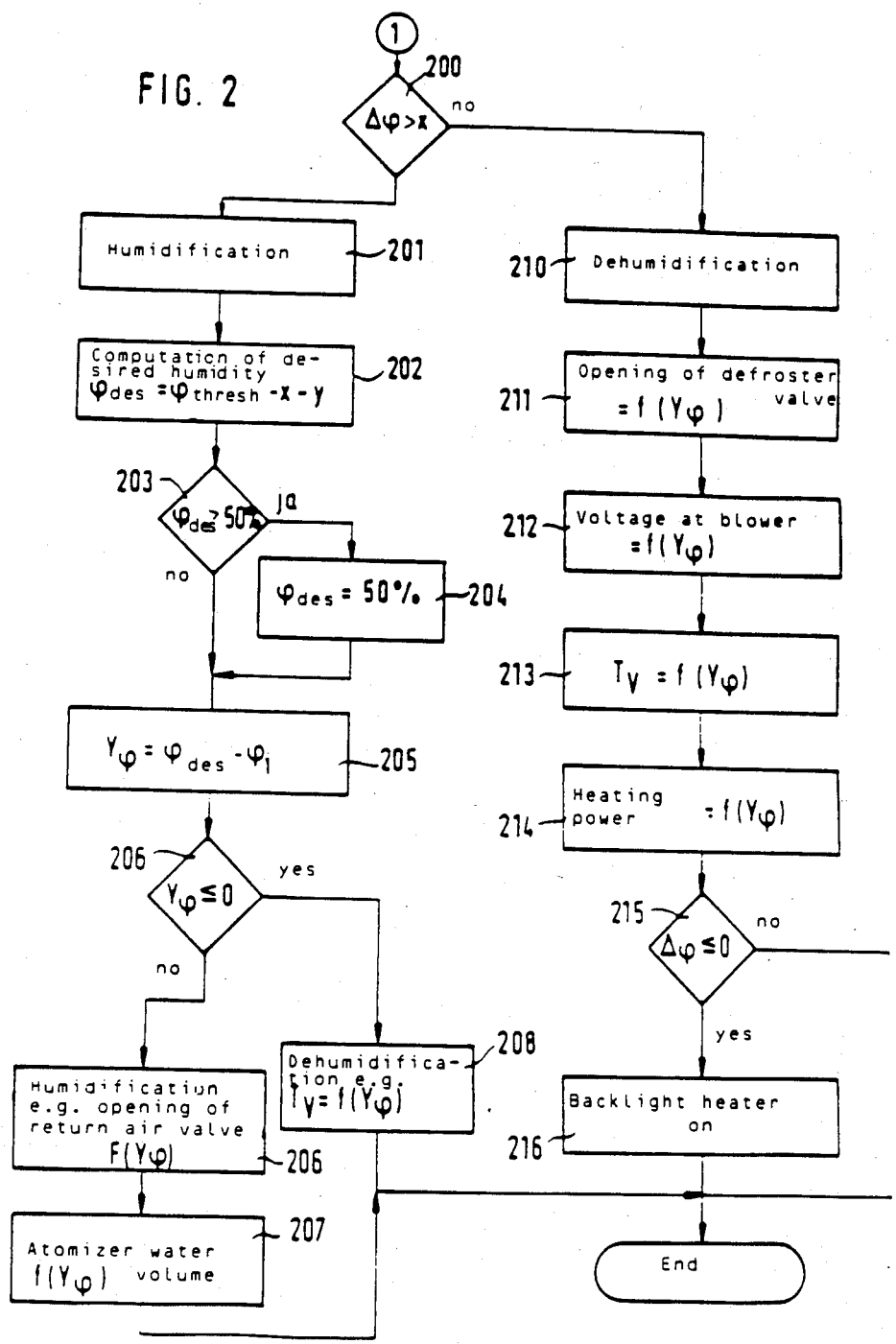

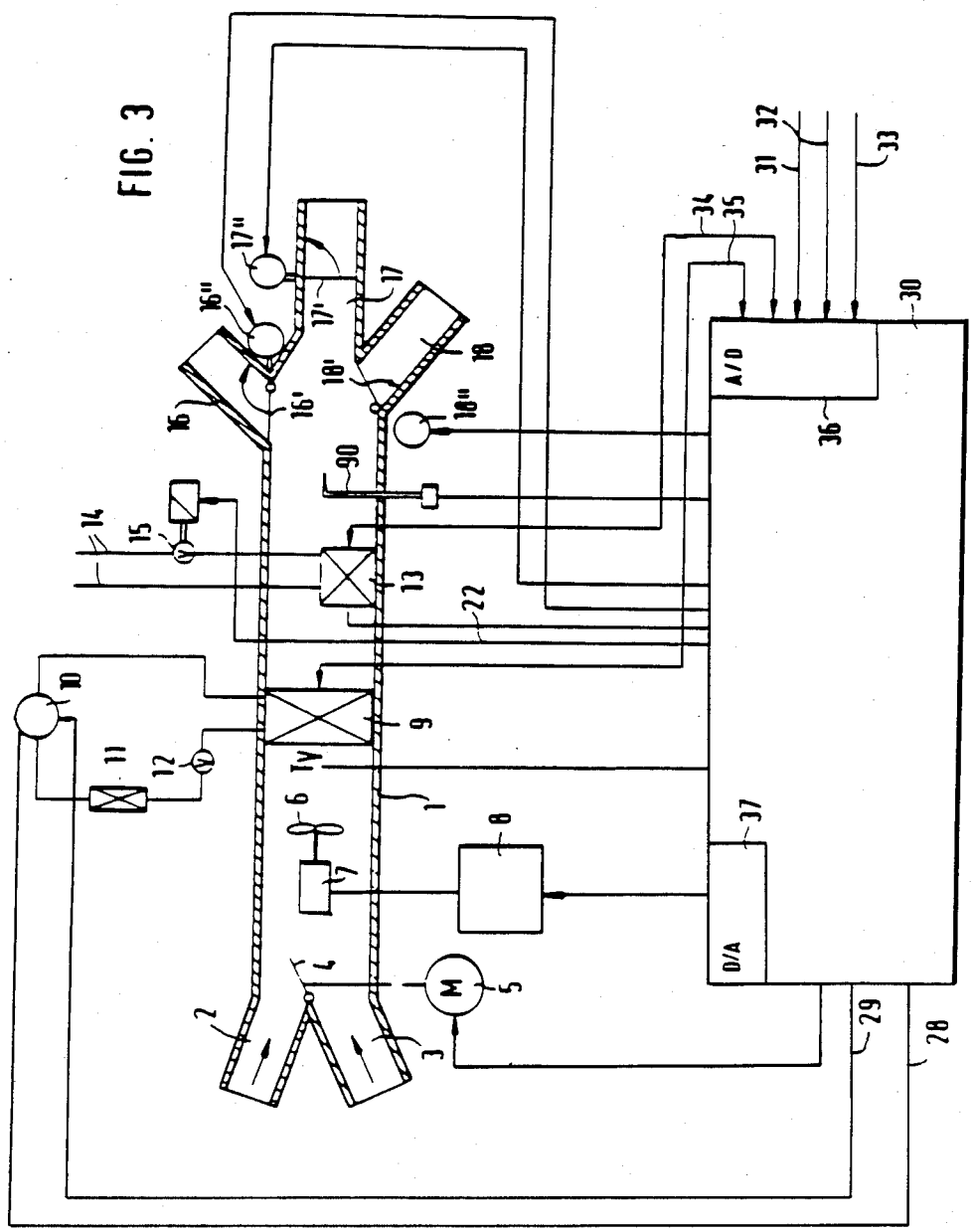

AIR CONDITIONER HUMIDITY CONTROL SYSTEM

BACKGROUND OF THE INVENTION

This invention relates to an air conditioner system for a motor vehicle having devices in the air duct for regulating the humidity in the system. The humidity regulating devices are controlled by a microcomputer, which receives values for outside temperature, inside temperature and inside humidity, as measured by sensors, and adjusts the humidifying devices accordingly.

Such an air conditioner is described in EP-81-043,668, in which an air conditioner for a motor truck, with a driver's cab and a compartment behind the driver's seat, is described. If the compartment behind the driver's seat is occupied, conditioned air can be diverted there. Humidification of this conditioned air also takes place if the measured inside humidity falls below a stipulated desired value, in order to make the climate in the compartment behind the driver's cab more comfortable. However, in this prior art system, no consideration is given to the fact the glass panes must not be misted up. Rather, if the temperature is appropriately low, it is necessary to deal with misting of the panes. A blower, controlled by a microcomputer, is provided with this known air conditioner. In principle, this device is suitable for reducing humidity. However, with this device, the blower is not driven in dependence on the inside humidity (cf. EP-81-043,668, column 5, line 53).

German Offenlegungsschrift No. 3,215,802 shows a control for regulating the backlight heater of a motor vehicle, with which the backlight can, if necessary, be demisted.

German patent 3,504,156 showed an air conditioner in which a sensor inside the vehicle pane detects the condensation of water vapor and switches on a ventilator if the vehicle pane becomes misted.

No air conditioners are yet known, however, in which the relative air humidity in the interior of the motor vehicle is determined in such a way that a misting of the panes is avoided.

SUMMARY OF THE INVENTION

An object of the invention, therefore, is to provide a microcomputer operated air conditioning system for controlling the humidity in the interior of a motor vehicle.

Another object of the invention is to provide a humidity control system for a motor vehicle which prevents fogging or misting up of the windows.

A further object of the invention is to provide a humidity control system for a motor vehicle in which the humidity is controlled by a microcomputer on the basis of information indicating the values for outside temperature, inside temperature and inside humidity.

A still further object of the invention is the control of humidity within a motor vehicle whereby the inside humidity level is kept at a comfortable level, not to exceed a predetermined percent, the level of humidity being low enough to avoid misting up of the windows.

Another object of the invention is to provide a humidity control system for a motor vehicle in which humidification can be achieved by the selection of one or several humidifying means in the air duct of the control system.

A further object of the invention is to provide a method by which a microcomputer operates a humidity control system for a motor vehicle, to create pleasant interior conditions and prevent the fogging or misting up of the vehicle windows.

Still another object of the invention is to provide a method by which the humidity within an automobile is controlled by a microcomputer receiving signals or information indicative of outside temperature, inside temperature and inside humidity.

In accomplishing the foregoing objects, there has been provided in accordance with one aspect of the present invention an air conditioner for controlling the humidity within a motor vehicle having a window pane, comprising: an air duct; means within the air duct for varying the humidity of air passing through the air duct; means for measuring and generating signals representing measured values for outside temperature, temperature inside the vehicle and humidity inside the vehicle; means, including a microcomputer, for selectively operating the humidity varying means in response to signals received representing the values for outside temperature, inside temperature and inside humidity and for determining a threshold humidity as a ratio of the saturated vapor pressure inside the window pane and the saturated vapor pressure of the inside air, the microcomputer actuating the humidity varying means if the difference between threshold humidity and inside humidity differs from a first stipulated value.

In accordance with another aspect of the invention, there has been provided a method of controlling the humidity within a motor vehicle having a window pane, comprising the steps of (a) measuring outside temperature, temperature inside the vehicle and the humidity inside the vehicle; (b) determining a threshold humidity from the measurements of step the threshold humidity being the ratio of the saturated vapor pressure inside at the window pane and the saturated vapor pressure of the inside air; (c) determining if the difference between the threshold humidity and the inside humidity falls below or exceeds a stipulated value; and (d) activating a dehumidification device if the difference determined in step (c) falls below the stipulated value and activating a humidification device if the difference exceeds the stipulated value.

Other objects, features and advantages of the present invention will become apparent from the following detailed description of preferred embodiments. It should be understood, however, that the detailed description and the specific embodiments, while indicating preferred embodiments of the invention, are given by way of illustration only, since various changes and modifications within the spirit and scope of the invention will become apparent to those skilled in the art.

BRIEF DESCRIPTION OF THE DRAWINGS

The invention is explained below, with the aid of the attached drawings, in which:

FIG. 2 shows a flowchart for controlling humidification and dehumidification within a motor vehicle; and FIG. 3 shows an air duct with various devices for achieving humidification and dehumidification.

DETAILED DESCRIPTION OF THE PREFERRED EMBODIMENTS

Figure 1:
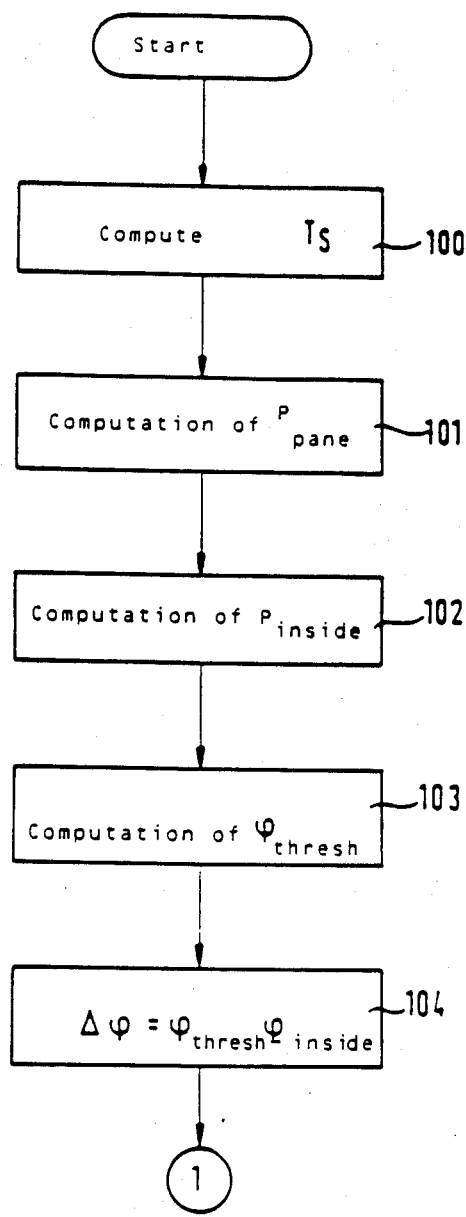
FIG. 1 shows a flowchart for computing the threshold humidity.

The air conditioner of this invention is designed so that humidity control in the interior of a motor vehicle can take place without misting up of the panes. Also, humidity is nevertheless maintained at a value perceived as pleasant.

According to the invention, in that, from values for outside temperature, inside temperature and inside humidity, a microcomputer determines the threshold humidity as the ratio of the saturated vapor pressure inside the pane and of the saturated vapor pressure of the inside air, and actuates various devices for dehumidification if the difference between the threshold humidity and the inside humidity falls below a stipulated value.

Various devices for dehumidification are used, for example, a blower arranged in the air duct, a defroster valve for the air duct, an evaporator arranged in the air duct and belonging to a cooling installation present in the motor vehicle, and a heat exchanger arranged in the air duct and fed by the coolant circuit for the engine. These devices are then driven via the said microcomputer, depending on the difference between threshold humidity and inside humidity.

An advantageous development of the invention provides that the microcomputer actuates devices for humidification if the inside humidity falls below a predetermined desired value of inside humidity. In this connection, the desired value for the inside humidity is stipulated so that it lies below the value of the inside humidity above which dehumidification, according to the invention, begins. However, the desired value of the inside humidity is restricted to 50%, in any event, because a higher value is perceived as unpleasant.

The determination of the saturated vapor pressure inside at the pane and of the saturated vapor pressure of the inside air, can take place in various ways. For example, the saturated vapor pressure can be determined from the temperature, it being possible for the temperature of the pane either to be measured directly or computed from the inside temperature, outside temperature and speed.

Humidification can take place either by opening the return air valves as a function of the difference between desired value of the inside humidity and the actual inside humidity, or by controlling the amount of water of a separately provided humidification device, for example an atomizer.

As seen in FIG. 3, the air conditioner includes an air duct (1). The air feed takes place via shafts (2 or 3), the shaft (2) serving to feed return air, the shaft (3) to feed fresh air. The control takes place via a valve (4), actuated by a servomotor (5). Arranged behind the valve (4) in the direction of flow is a blower (6), which is driven by a motor (7). The driving of a motor (7) takes place via a control device (8). Arranged behind the blower (6) in the direction of flow is the evaporator (9) of a cooling installation, which, in a known fashion, further includes a compressor (10), a condenser (11), and an expansion valve (12) as well as the appropriate coolant lines. Arranged in the air duct (1) behind the evaporator (9), in the direction of air flow, is a heat exchanger (13), connected via lines (14) to the engine coolant system of the motor vehicle. The driving of the heat exchanger takes place via a timing valve (15). The air duct (1) terminates in shafts (16, 17 or 18), the shaft (16) being associated with the defroster openings at the windshield, the shaft (17) with the ventilation openings at the dashboard, and the shaft (18) with the footwell of the motor vehicle. The volume of conditioned air emerging through the individual shafts is determined by the position of the valves (16',17' and 18'), which can be set via servomotors (16",17" and 18").

The driving of the servomotors for the valves (4, 16', 17', 18') of the engine (7), of the timing valve (15), of the evaporator temperature and of the heat exchanger and, further, of the compressor coupling (line 28) and of an adjustment device of the compressor (line 29) takes place via the microcomputer (30).

The microcomputer (30) further receives values determined by sensors for the inside temperature in the motor vehicle, the outside temperature and the inside humidity. These sensors are symbolized by the lines (31, 32, 33). The actual temperature of the heat exchanger (13) is fed to the microcomputer via the line (34), and the actual temperature of the evaporator (9) is fed via the line (35). The conversion of the values incident in analog mode takes place in an A/D converter (36). Conversely, the conversion of the values determined by the microcomputer for controlling the motor (7) and the blower (6) takes place in a D/A converter (37). The mode of operation of the microcomputer (30) is explained below with the aid of flowcharts of FIGS. 1 and 2.

After the start, referring to FIG. 1, computation of the temperature of the pane ($T_S$) takes place in step 100 to the extent that it is not directly available as a result of a measurement (in which case, an appropriate measurement by a sensor is provided, as in FIG. 3). The computation takes place as a function of the inside temperature ($T_i$), the outside temperature ($T_a$) and the speed (v), as follows:

$$T_S = f(T_i, T_a, v) = (1-a) T_{i\%} + a T_a,$$

where $$a = \frac{0.359 \, v^{0.8}}{1.143 + 0.382 \, v^{0.8}}$$

for $v \geq 10$ km/h; and a for $v < 10$ km/h $= a$ ($v = 10$ km/h).

The saturated vapor pressure ($P_s$) of the inside of the pane is determined from ($T_s$). This takes place according to known thermodynamic laws, and, therefore, requires no further explanation. In the same way, the saturated vapor pressure of the inside air ($P_i$) is determined from ($T_i$). This takes place in steps 101 and 102. In the next step, the threshold humidity ($1_{thresh}$) is computed from these two values, namely as follows:

$$l_{thresh} = \frac{P_s}{P_i} \cdot 100\%$$

In this connection, different values arise, depending on the time of year and the measured parameters, for example, 70% in autumn and 40% in winter. This "threshold humidity" is the governing value for subsequent control. A higher value of interior humidity is not obtained, because the panes mist up.

The determination of "humidity difference" ($\Delta l$) takes place in step 104. It is the difference between the threshold humidity (1 $_{thresh}$) and the inside humidity ($l_i$). This humidity difference ($\Delta l$) is the starting point for the control according to FIG. 2.

Referring now to FIG. 2, the humidity difference ($\Delta l$) is compared to a stipulated separation (x), to determine if it is larger or smaller. The value x can, e.g., amount to 12%, which depends on the particular vehicle and is to be maintained on grounds of safety. There is either humidification (left hand side of the flowchart) or dehumidification (right hand side of the flowchart). The decision is made in step 200.

If now, $\Delta l > x$, humidification takes place, as represented in step 201. In step 202, a desired value ($l_{des}$), the desired humidity, is determined, namely in such a way that $$l_{des} = l_{thresh} - x - y,$$

where y is the control deviation of a proportional controller, for example, 5%. However, in order to guarantee that the desired humidity ($l_{des}$) is in no instance to be established above 50%, a check takes place in step 203 as to whether the desired humidity determined in step 202 is greater than 50%. If this is the case, the desired humidity is fixed at 50% in step 204. This takes place because a relative humidity of more than 50% is perceived as unpleasant.

In step 205, the desired humidity, determined either in step 202 or step 204, is now used to determine the control quantity ($y_l$) as follows:

$$y_l = l_{thresh} - l_i$$

This takes place in step 205. In step 206, a check is made to determine whether the control magnitude (y), determined in this way, is equal to 0 or greater than 0. If the magnitude is not less than, or equal to 0, then humidification takes place, as represented in step 206. This can, for example, take place via setting of the valve (4) in such a way that the return air feed is released via the valve (2) and the fresh air feed is blocked via valve (3), the degree of opening taking place as a function of the manipulated quantity ($y_l$). Additionally, if a humidification device, for example an atomizer (90), is present, then the volume of water can likewise be metered in as a function of the manipulated quantity ($y_l$). Should it transpire in step 206 that the manipulated quantity ($y_l$) is less than or equal to 0, i.e. that there has been too much humidification, then it is necessary to switch off the humidification device and undertake a degree of dehumidification, by, if necessary, a slight lowering of the temperature of the evaporator (9), that is, by an appropriate control of $T_v$ as a function of the manipulated magnitude ($y_l$).

Should it transpire in step 200 that the safety separation between threshold humidity and actually measured inside humidity is less than or equal to x, then, as shown at 210, in common with dehumidification measures, measures are instituted against a misting-up of the panes. This is possible through opening the valves (16') for the defroster valves (shaft 16), by increasing the voltage applied at the engine (7) for the blower (6), by lowering the temperature of the evaporator, by increasing the heating power at the heat exchanger (13) or by increasing the frequency with which the timing valve (15) is clocked. All these drives can take place as a function of the humidity difference ($\Delta l$). The corresponding control steps are denoted in steps 211 to 214. There then follows in the same program run the check as to whether the humidity difference ($\Delta l$) is smaller than or equal to 0. This takes place in step 215. If $\Delta l$ is less than 0, then, as represented at 216, the backlight heater is switched on.

The sequence shown is repeated in definite timing steps, for example every tenth of a second. In this way, it is always guaranteed that, on the one hand, the humidification devices are switched on, insofar as the desired humidity has not been reached, and, on the other hand, that the dehumidification devices are actuated, as long as the humidity difference has not reached the safety separation from the computed threshold humidity which has precisely still to be observed.

The sequences outlined with the aid of the flowcharts could also be regarded as process steps for it is a question of steps for determining the correct operating position of the individual dehumidification or humidification devices, and consequently, however, in the end, a question of an air conditioner—seen as such—which works in this way, or is to be characterized thereby.

However, within the overall control concept of a motor vehicle, contrary conditions can be predetermined in terms of the temperature control and these can contradict the humidity control. In these cases, the temperature control has priority.

What is claimed is:

1. An air conditioner for controlling the humidity within a motor vehicle having a window pane comprising:

an air duct;

means within the air duct for varying the humidity of air passing through the air duct;

means for measuring and generating signals representing measured values for outside temperature, temperature inside the vehicle and humidity inside the vehicle; and means, including a microcomputer, for selectively operating said humidity varying means in response to signals received representing said values for outside temperature, inside temperature and inside humidity and for determining a threshold humidity as a ratio of the saturated vapor pressure inside the window pane and the saturated vapor pressure of the inside air, the microcomputer actuating the humidity varying means if the difference between threshold humidity and inside humidity differs from a first stipulated value.

2. An air conditioner according to claim 1, wherein said humidity varying means includes a humidifying device and the microcomputer actuates said humidifying device if the inside humidity falls below a predetermined desired value for the inside humidity by a stipulated value.

3. An air conditioner according to claim 1, wherein said humidity varying means includes a dehumidifying device comprising a blower in the air duct, and means for increasing the voltage applied to the blower as a function of the difference between the threshold humidity and the inside humidity.

4. An air conditioner according to claim 1, wherein said humidity varying means includes a dehumidification device comprising a defroster valve in the air duct, and means for opening the valve as a function of the difference between the threshold humidity and the inside humidity.

5. An air conditioner according to claim 1, wherein said humidity varying means includes a device comprising an evaporator in the air duct, and means for operating said evaporator in response to the difference between threshold humidity and inside humidity.

6. An air conditioner according to claim 1, wherein said humidity varying means includes a dehumidification device comprising, a heat exchanger in the air duct, the heat exchanger connected to the coolant circuit of the engine, and means for increasing the heat from the heat exchanger as a function of the difference between the threshold humidity and the inside humidity.

7. An air conditioner according to claim 2, further including a return air valve at the inlet of the air duct, and means for opening the inlet as a function of the difference between the predetermined desired value of inside humidity and the actual inside humidity.

8. An air conditioner according to claim 2, wherein said humidifying device includes means for determining a volume of water provided by the humidifying device as a function of the difference between the predetermine desired value of the inside humidity and the actual inside humidity.

9. An air conditioner according to claim 2, wherein the predetermined desired value of inside humidity does not exceed 50%.

10. An air conditioner according to claim 1, wherein the saturated vapor pressure inside at the pane is computed from the temperature of the pane, ($T_S$), this temperature being a function of the inside temperature, ($T_i$), the outside temperature ($T_a$) and the speed of the vehicle (v), according to the formula:

$$T_S = (1-a) T_i + aT_a$$

where $$a = \frac{0.359 \, v^{0.8}}{1.143 + 0.382 \, v^{0.8}}$$

for values of v equal to or greater than 10 km/h; and, for values of v less than 10 km/h, a=a (v=10 km/h).

11. An air conditioner according to claim 1, including means for selectively supplying the air duct with recirculating air or fresh air, depending on the level of humidity sought.

12. An air conditioner according to claim 1, further including a heat exchanger and an evaporator in the air duct, the microcomputer receiving and responding to information indicating the temperature of the heat exchanger and the temperature of the evaporator.

13. A method of controlling the humidity within a motor vehicle having a window pane, comprising the steps of:
  (a) measuring outside temperature, temperature inside the vehicle and the humidity inside the vehicle;
  (b) determining a threshold humidity from the measurements of step (a), the threshold humidity being the ratio of the saturated vapor pressure inside at the window pane and the saturated vapor pressure of the inside air;
  (c) determining if the difference between the threshold humidity and the inside humidity falls below or exceeds a stipulated value; and
  (d) activating a dehumidification device if the difference determined in step (c) falls below the stipulated value and activating a humidification device if the difference exceeds the stipulated value.

14. The method of claim 13, in which the measurements of step (a) are applied to a microcomputer for the purpose of carrying out steps (b) to (d).

15. The method of claim 13, further including a plurality of humidification and dehumidification devices located in the air duct of a motor vehicle air conditioner, the microcomputer selectively activating or deactivating the devices in order to control the level of humidity and prevent fogging of the vehicle window pane.

16. The method of claim 13, in which the microcomputer refrains from activating the humidification device if the inside humidity equals or exceeds 50%.

* * * * *